United States Patent
Egger et al.

(10) Patent No.: US 8,417,918 B2
(45) Date of Patent: Apr. 9, 2013

(54) RECONFIGURABLE PROCESSOR WITH DESIGNATED PROCESSING ELEMENTS AND RESERVED PORTION OF REGISTER FILE FOR INTERRUPT PROCESSING

(75) Inventors: Bernhard Egger, Seoul (KR); Dong-hoon Yoo, Seoul (KR); Soo-jung Ryu, Hwaseong-si (KR); Il-hyun Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 477 days.

(21) Appl. No.: 12/709,862

(22) Filed: Feb. 22, 2010

(65) Prior Publication Data

US 2010/0274939 A1  Oct. 28, 2010

(30) Foreign Application Priority Data

Apr. 22, 2009  (KR) .................. 10-2009-0035100

(51) Int. Cl.
*G06F 15/16*  (2006.01)

(52) U.S. Cl. ......................................... 712/15; 712/244

(58) Field of Classification Search .................. None
See application file for complete search history.

(56) References Cited

U.S. PATENT DOCUMENTS

| | | | |
|---|---|---|---|
| 5,570,330 A * | 10/1996 | Okawa ....................... | 369/44.32 |
| 7,350,006 B2 | 3/2008 | Yasue et al. | |
| 7,529,917 B2 | 5/2009 | Ryu et al. | |
| 7,702,835 B2 * | 4/2010 | Riethmuller ................. | 710/260 |
| 7,836,291 B2 * | 11/2010 | Yim et al. ..................... | 712/244 |
| 7,853,779 B2 * | 12/2010 | Barry et al. ................... | 712/244 |
| 7,934,121 B2 * | 4/2011 | Ritz et al. ........................ | 714/11 |
| 2005/0028159 A1 | 2/2005 | Kodama et al. | |
| 2007/0079039 A1 * | 4/2007 | Raj ............................... | 710/260 |

FOREIGN PATENT DOCUMENTS

| | | |
|---|---|---|
| JP | 2005-50208 | 2/2005 |
| JP | 2006-216042 | 8/2006 |
| KR | 10-0681199 | 2/2007 |
| KR | 10-2007-0117605 | 12/2007 |
| WO | WO 2007/088816 A1 | 8/2007 |

* cited by examiner

*Primary Examiner* — Kenneth Kim
(74) *Attorney, Agent, or Firm* — NSIP Law

(57) ABSTRACT

An interrupt handling technology and a reconfigurable processor are provided. The reconfigurable processor includes a plurality of processing elements, and some of the processing elements are designated for interrupt handling. When an interrupt request occurs while the reconfigurable processor is executing a loop operation, the designated processing elements may process the interrupt request. The interrupt handling technology allows the interrupt request and the loop operation to be processed in parallel.

12 Claims, 4 Drawing Sheets

RECONFIGURABLE PROCESSOR WITH DESIGNATED PROCESSING ELEMENTS AND RESERVED PORTION OF REGISTER FILE FOR INTERRUPT PROCESSING

CROSS REFERENCE TO RELATED APPLICATION

This application claims the benefit under 35 U.S.C. §119(a) of a Korean Patent Application No. 10-2009-0035100, filed on Apr. 22, 2009, with the Korean Intellectual Property Office, the entire disclosure of which is incorporated herein by reference for all purposes.

BACKGROUND

1. Field

The following description relates to interrupt handling technology that may be used by a reconfigurable processor.

2. Description of the Related Art

A reconfigurable architecture is an architecture that can alter the hardware configuration is of a computing device based on the tasks to be performed by the computing device. When a task is processed using only hardware, it is difficult to efficiently handle even a slight alteration to the task due to the fixed hardware function. On the other hand, when a task is processed using only software, it is possible to alter the software according to the task and process the task using the altered software. However, the task is processed slower than when the task is processed using fixed hardware.

A reconfigurable architecture offers the advantages of both hardware and software. For these reasons, the use of reconfigurable architecture has increased, especially in the field of digital signal processing where the same tasks are often repeatedly performed.

There are a number of types of reconfigurable architecture, for example, a coarse-grained array (CGA). A CGA includes a plurality of processing units, and the connection state between the processing units may be changed according to each task to be performed.

However, problems arise when an interrupt occurs while a CGA is executing a loop operation. Examples of interrupts include a hardware interrupt, for example, an external input/output device, a timer, an exception such as an undefined instruction, and the like. Examples of interrupts also include software interrupts, for example, system calls, and the like. Generally, when an interrupt occurs, "context saving" is required. That is, current context stored in a register should be stored in a memory while the interrupt is handled and then should to be restored. However, because a CGA includes a plurality of register files, an excessive amount of overhead is created when an interrupt that occurs, because context from the plurality of registers is saved.

SUMMARY

In one aspect, provided is a reconfigurable processor comprising a plurality of processing elements, including one or more designated processing elements designated for processing an interrupt request, wherein the processing elements not designated are processing elements for processing an instruction other than the interrupt request.

The processing elements not designated may execute a loop operation, and the designated processing elements may process the interrupt request that occurs during the execution of the loop operation.

The interrupt request may be processed in parallel with the loop operation.

In another aspect, provided is a reconfigurable processor comprising a coarse-grained array (CGA) comprising a plurality of processing elements, a host processor sharing one or more of the processing elements with the CGA, and a controller designating one or more of processing elements shared by the host processor and controlling the one or more designated processing elements to process an interrupt request that occurs while the CGA is executing a loop operation.

The reconfigurable processor may further comprise a central register file storing processing results of the CGA and the host processor, wherein the controller reserves a portion of the central register file for interrupt handling.

The controller may map instructions related to the loop operation to the processing elements excluding the designated processing elements.

The interrupt request may be processed in parallel with the loop operation.

In another aspect, provided is a reconfigurable processor comprising a coarse-grained array (CGA) comprising a plurality of first processing elements, a host processor formed separate from the CGA and comprising a plurality of second processing elements, and a controller designating one or more of the second processing elements and controlling the designated processing elements to process an interrupt request that occurs while the first processing elements of the CGA are executing a loop operation.

The reconfigurable processor may further comprise a central register file storing processing results of the CGA and the host processor, wherein the controller reserves a portion of the central register file for interrupt handling.

The controller may map instructions related to the loop operation to the first processing elements.

The interrupt request may be processed in parallel with the loop operation.

In another aspect, provided is an interrupt handling method for a reconfigurable processor that comprises a plurality of processing elements, the interrupt handling method comprising designating one or more of the plurality of processing elements, executing a loop operation by the plurality of processing elements excluding the designated processing elements, determining whether an interrupt request has occurred while the processing elements excluding the designated processing elements are executing the loop operation, and controlling the one or more designated processing elements to process the interrupt request when the interrupt request has occurred.

The designating of the one or more of the processing elements may comprise mapping instructions related to the loop operation to the processing elements excluding the designated processing elements.

The interrupt request may be processed in parallel with the loop operation.

Other features and aspects will be apparent from the following description, the drawings, and the claims.

Figure 1:
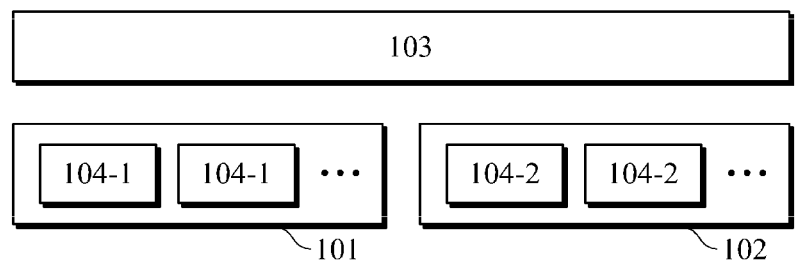
FIG. 1 is a diagram illustrating an example of a reconfigurable processor.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of a reconfigurable processor. Referring to FIG. 1, the example reconfigurable processor 100 includes a coarse-grained array (CGA) 101, a host processor 102, and a controller 103.

The CGA 101 includes a plurality of processing elements 104-1. The processing elements 104-1 may process instructions in parallel. The connection state between the to processing elements 104-1 included in the CGA 101 may vary according to a task to be processed. In a loop operation, the same calculation is repeated. The loop operation may be executed by the CGA 101. In the example of the loop operation, the connection state between the processing elements 104-1 included in the CGA 101 may be optimized for repeated calculation. For example, the processing elements 104-1 may be simultaneously operated using loop-level parallelism. By simultaneously operating the processing elements 104-1, the CGA 101 may process instructions more efficiently.

The host processor 102 includes a plurality of processing elements 104-2. The processing elements 104-2 may process instructions in parallel. The host processor 102 may be, for example, a very long instruction word (VLIW) processor and may process general operations other than a loop operation.

The controller 103 may designate some of the processing elements 104-1 and/or 104-2 for interrupt handling. The designated processing elements may be used to process an interrupt request that occurs during the execution of a loop operation.

The controller 103 may include, for example, a compiler or an interpreter that reserves some of the processing elements 104-1 and 104-2 for interrupt handling and maps instructions to the remaining processing elements. The controller 103 may include, for example, an interrupt manager that monitors the occurrence of an interrupt request and, when an interrupt request occurs, controls reserved processing elements to process the interrupt request.

The reconfigurable processor 100 may operate in various modes, for example, a CGA mode and a VLIW mode. For example, the reconfigurable processor 100 may process a loop operation in the CGA mode and process a general operation in the VLIW mode. The controller 103 may change the mode of the reconfigurable processor 100, for example, converting the reconfigurable processor 100 from CGA mode to VLIW mode.

Figure 2:
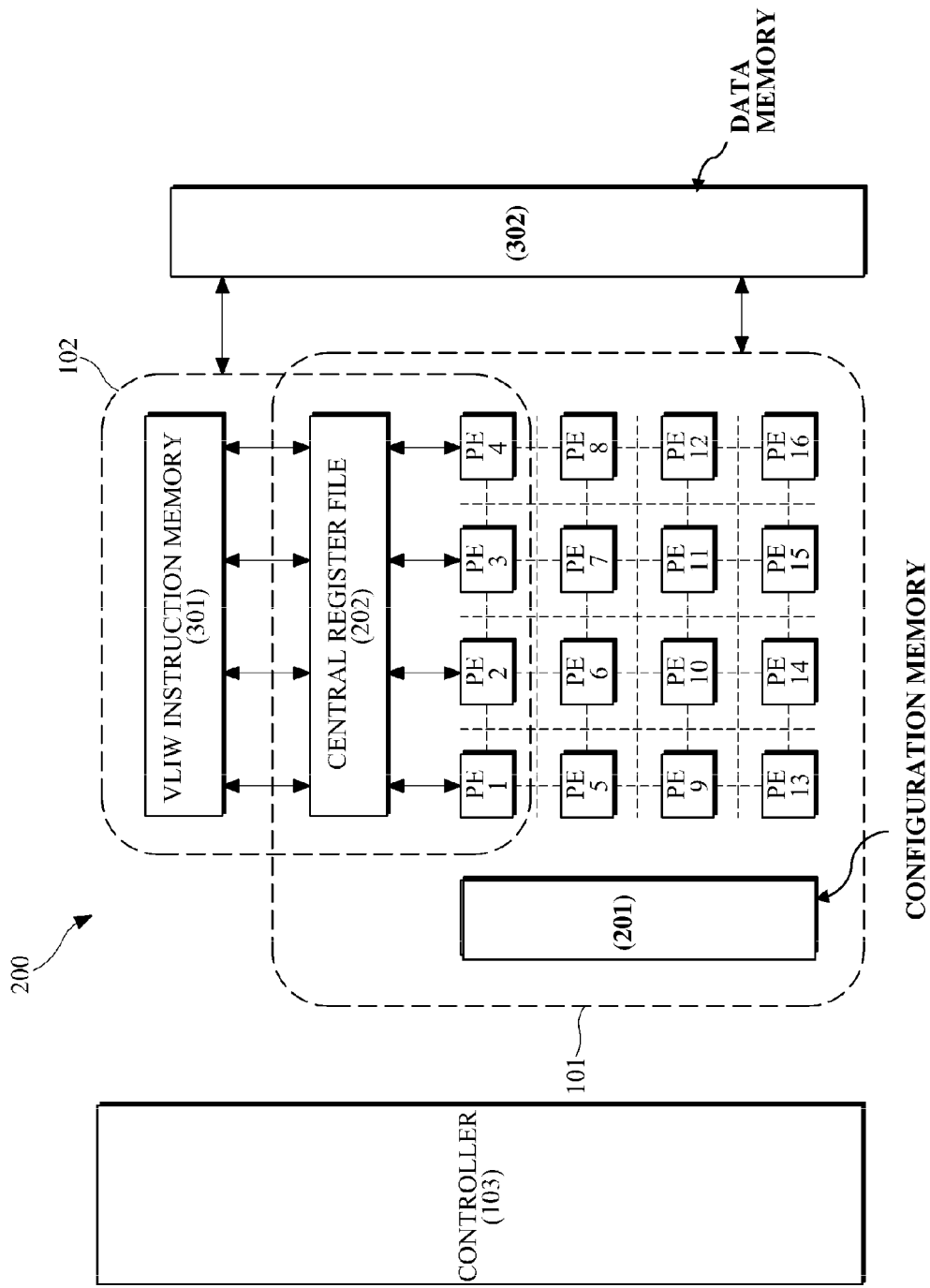
FIG. 2 is a diagram illustrating a second example of a reconfigurable processor.

In some embodiments, the CGA 101 and the host processor 102 may share one or more of the processing elements 104-1 and 104-2. FIG. 2 illustrates a second example of a reconfigurable processor where a portion of the processing elements are shared.

Referring to FIG. 2, the example reconfigurable processor 200 includes a CGA 101, a host processor 102, and a controller 103.

In this example, the CGA 101 includes 16 processing elements PE1 through PE16, a configuration memory 201, and a central register file 202. The number of processing elements may be more than 16 or less than 16. The elements PE1 through PE16 are merely for example, and are not meant to limit the number of processing elements that may be included in the CGA. The processing elements PE1 through PE16 may include a function unit or may include a function unit and a register file. The processing elements PE1 through PE16 may process tasks in parallel.

The processing elements PE1 through PE16 may be connected to each other. For example, an output of the processing element PE7 may be connected to an input of another processing element PE12. Various combinations of outputs may be connected to any desired inputs of the processing elements.

The processing elements PE1 through PE16 may be connected in numerous combinations. The connection state between the processing elements PE1 through PE16 is referred to herein as the configuration of the CGA 101, and information about the configuration of the CGA 101 may be stored in the configuration memory 201. The configuration of the CGA 101, that is, the connection state between the processing elements PE1 through PE16, may be changed according to information selected from the configuration memory 201. The configuration of the CGA 101 may be changed to optimize the processing of a loop operation in which the same calculation is repeated.

The central register file 202 temporarily stores processing results during mode conversion. In this example, the host processor 102 includes four processing elements PE1 through PE4, the central register file 202, and a VLIW instruction memory 301. The host processor 102 may configure a VLIW architecture using the four processing elements PE1 through PE4.

In the VLIW architecture, one instruction word includes a plurality of instructions that may be processed in parallel. Thus, each of the processing elements PE1 through PE4 may process these instructions in parallel. The VLIW instruction memory 301 may fetch an instruction from a data memory 302 and decode the fetched instruction.

As shown in FIG. 2, the CGA 101 and the host processor 102 share the processing elements PE1 through PE4. For example, the processing elements PE1 through PE4 may process the loop operation in the CGA mode and process a general operation in the VLIW mode.

The controller 103 designates some of the processing elements PE1 through PE4 included in the host processor 102 for interrupt handling. For example, the controller 103 may map instructions only to the processing elements PE3 through PE16 during a compiling process, excluding the designated processing elements PE1 and PE2. The controller 103 may also reserve part of the central register file 202 for interrupt handling.

When an interrupt request occurs while the CGA 101 is executing the loop operation, the controller 103 may control the designated processing elements PE1 and PE2 to process the interrupt request. In this example, the loop operation may be executed continuously by the remaining processing elements PE3 through PE16.

Because the designated processing elements PE1 and PE2 make it possible to process an interrupt request and the loop operation in parallel, latency for interrupt handling may be removed.

Figure 3:
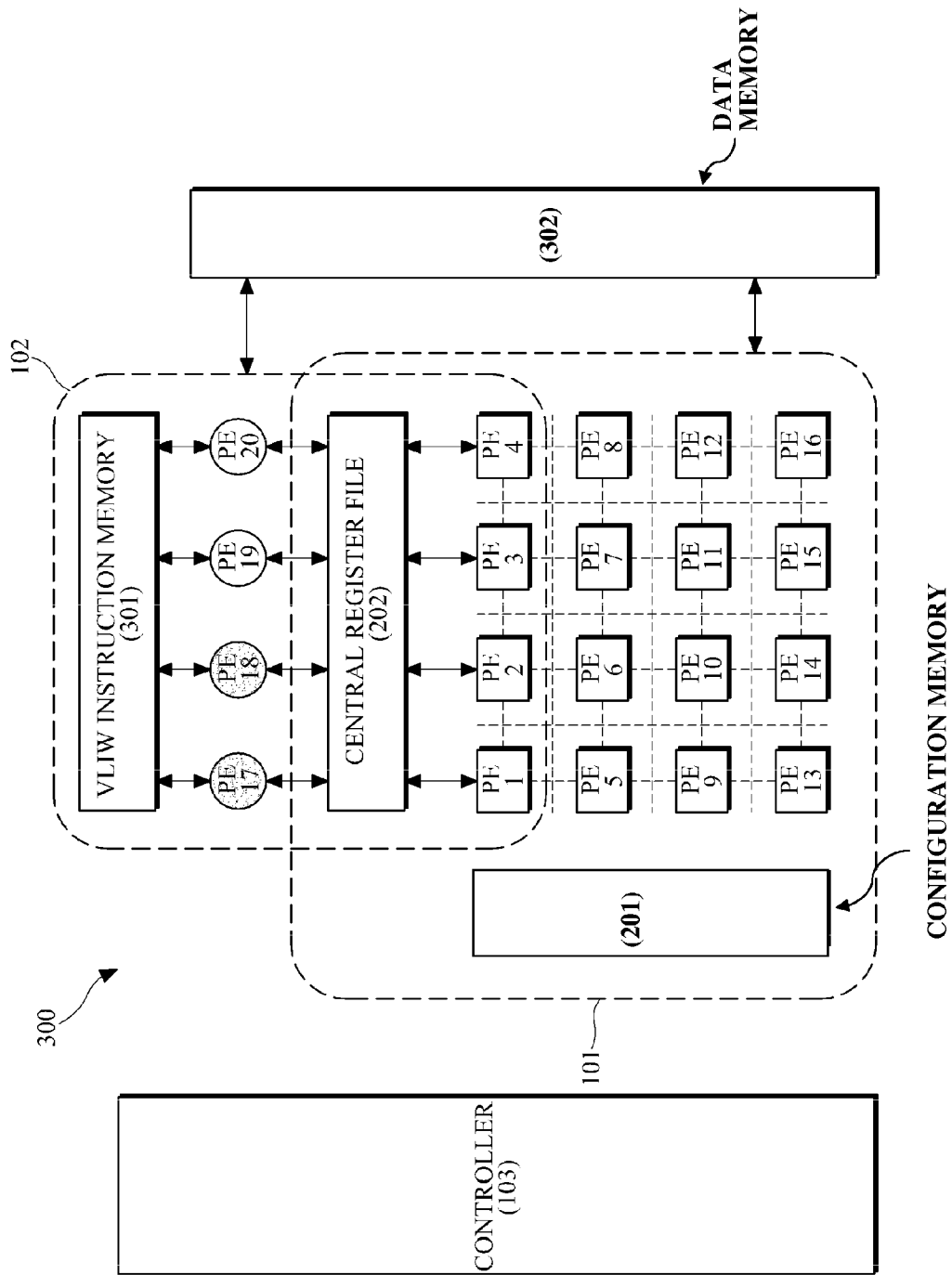
FIG. 3 is a diagram illustrating a third example of a reconfigurable processor.

In some embodiments, processing elements are not shared by the CGA and the host processor. FIG. 3 illustrates a third example of a reconfigurable processor where the processing elements are not shared. Referring to FIG. 3, the example reconfigurable processor 300 includes a CGA 101, a host processor 102, and a controller 103.

The example CGA 101 includes 16 processing elements PE1 through PE16, a configuration memory 201, and a central register file 202. The processing elements PE1 through PE16, the configuration memory 201, and the central register file 202 are the same as those described above with reference to FIG. 2

In this example, the host processor 102 includes four processing elements PE17 through PE20, the central register file 202, and a VLIW instruction memory 301. The central register file 202 and the VLIW instruction memory 301 are the same as those described above with reference to FIG. 2.

As shown in FIG. 3, the CGA 101 and the host processor 102 do not share processing elements. The CGA 101 includes processing elements PE1 through PE16 and the host processor 102 includes processing elements PE17 through PE20. The processing elements PE1 through PE16 may process the loop operation in the CGA mode, and the processing elements PE17 through PE20 may process a general operation in the VLIW mode.

The controller 103 may designate some of the processing elements PE17 through PE20 included in the host processor 102 for interrupt handling. For example, the controller 103 may map instructions to the processing elements PE1 through PE16 or PE19 and PE20 during a compiling process, excluding the designated processing elements PE17 and PE18. The controller 103 may also reserve part of the central register file 202 for interrupt handling.

When an interrupt request occurs while the CGA 101 is executing the loop operation, the controller 103 may control the designated processing elements PE17 and PE18 to process the interrupt request, and the loop operation may be executed continuously by the CGA 101.

Because the designated processing elements PE17 and 18 make it possible to process an interrupt request and the loop operation in parallel, latency for interrupt handling may be removed.

Figure 4:
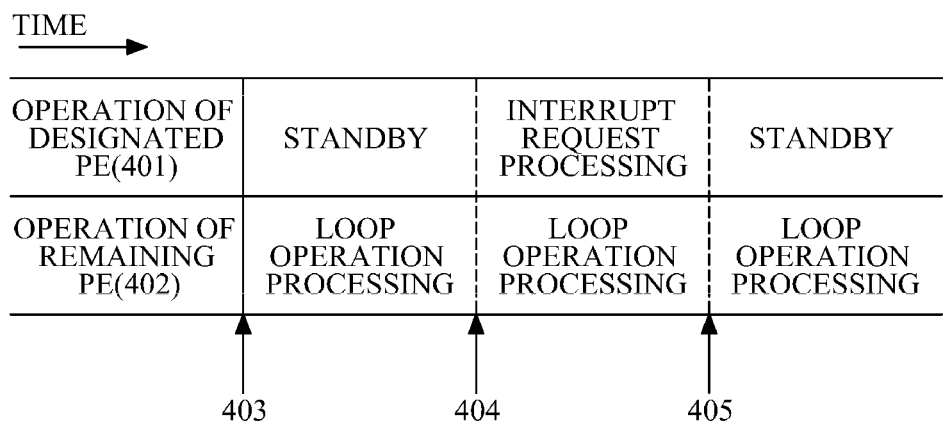
FIG. 4 is a diagram illustrating an example process of a loop operation and an interrupt request being performed in parallel.

FIG. 4 illustrates an example of a process of a loop operation and an interrupt request that are performed in parallel. In this example, the loop operation and the interrupt request occur in the CGA mode.

As shown in FIG. 4, reference numeral 401 indicates the operation of designated processing elements and reference numeral 402 indicates the operation of the remaining processing elements. In addition, reference numeral 404 indicates a time when an interrupt request occurs. Before an interrupt request occurs (at times 403 and 404), the designated processing elements remain in a standby state, and the remaining processing elements execute a loop operation.

When the interrupt request occurs at time 404, the designated processing elements process the interrupt request. As described above, the designated processing elements may be reserved in a compiling process for interrupt handling. Thus, the designated processing elements may immediately participate in interrupt handling, while the remaining processing elements may continue to execute the loop operation.

At a time 405 when the processing of the interrupt request is completed, the designated processing elements return to the standby state, and the remaining processing elements continue to execute the loop operation. Accordingly, even if an interrupt request occurs, the loop operation may be continuously executed.

Figure 5:
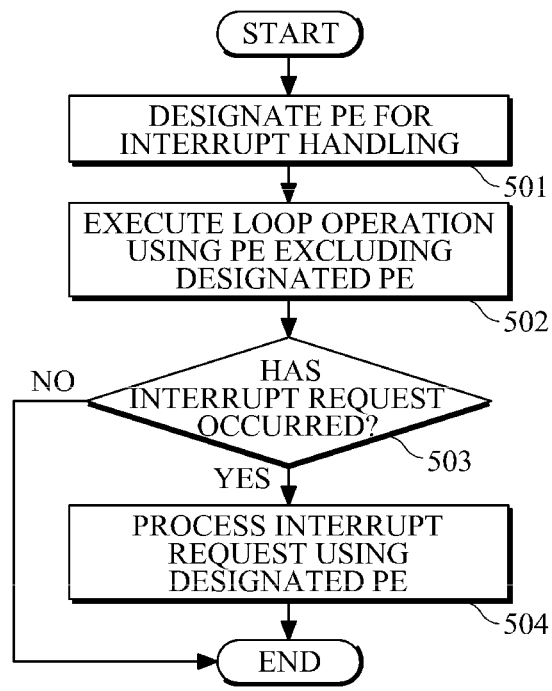
FIG. 5 is a flowchart illustrating an example of an interrupt handling method.

FIG. 5 is a flowchart that illustrates an example of an interrupt handling method. The method of FIG. 5 is an example of an interrupt handling method that may be used by the reconfigurable processors 100, 200, and 300, illustrated in FIGS. 1-3.

Referring to FIG. 5, in 501, one or more of a plurality of processing elements included in a reconfigurable processor are designated for interrupt handling. For example, the controller 103 may compile or schedule instructions such that the instructions are mapped only to processing elements, excluding the designated processing elements.

In 502, the loop operation is executed. For example, the processing elements excluding the designated processing elements may execute the loop operation in the CGA mode.

In 503, the method determines whether an interrupt request has occurred. For example, the controller 103 may monitor the occurrence of the interrupt request during the execution of the loop operation. The controller may monitor the occurrence of an interrupt request from the beginning of the loop operation until the end of the loop operation, or a portion thereof.

When the interrupt request has occurred, the designated processing elements process the interrupt request. For example, the controller 103 may control the designated processing elements to process the interrupt request, and the remaining processing elements may continue to process the loop operation.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A reconfigurable processor comprising:
   a plurality of processing elements, a connection state between the plurality of processing elements being reconfigurable, and the plurality of processing elements including one or more designated processing elements designated for processing an interrupt request;
   a controller configured to control the one or more designated processing elements to process the interrupt request; and
   a central register file configured to store processing results of the plurality of processing elements,
   wherein the processing elements not designated are processing elements for processing an instruction other than the interrupt request; and
   the controller reserves a portion of the central register file for processing the interrupt request.

2. The reconfigurable processor of claim 1, wherein the processing elements not designated execute a loop operation, and the designated processing elements process the interrupt request that occurs during the execution of the loop operation.

3. The reconfigurable processor of claim 2, wherein the interrupt request is processed in parallel with the loop operation.

4. A reconfigurable processor comprising:
   a coarse-grained array (CGA) comprising a plurality of processing elements, a connection state between the plurality of processing elements being reconfigurable;
   a host processor sharing one or more of the processing elements with the CGA;
   a controller designating one or more of processing elements shared by the host processor and controlling the one or more designated processing elements to process an interrupt request that occurs while the CGA is executing a loop operation; and
   a central register file storing processing results of the CGA and the host processor, wherein the controller reserve a portion of the central file for interrupt handling.

5. The reconfigurable processor of claim 4, wherein the controller maps instructions related to the loop operation to the processing elements excluding the designated processing elements.

6. The reconfigurable processor of claim 4, wherein the interrupt request is processed in parallel with the loop operation.

7. A reconfigurable processor comprising:
   a coarse-grained array (CGA) comprising a plurality of first processing elements, a connection state between the plurality of first processing elements being reconfigurable;
   a host processor formed separate from the CGA and comprising a plurality of second processing elements;
   a controller designating one or more of the second processing elements and controlling the designated processing elements to process an interrupt request that occurs while the first processing elements of the CGA are executing a loop operation; and
   a central register file storing processing results of the CGA and the host processor, wherein the controller reserves a portion of the central register file for interrupt handling.

8. The reconfigurable processor of claim 7, wherein the controller maps instructions related to the loop operation to the first processing elements.

9. The reconfigurable processor of claim 7, wherein the interrupt request is processed in parallel with the loop operation.

10. An interrupt handling method for a reconfigurable processor that comprises a plurality of processing elements, and a central register file configured to store processing results of the plurality of processing elements, a connection state between the plurality of processing elements being reconfigurable, the interrupt handling method comprising:
    designating one or more of the plurality of processing elements;
    executing a loop operation by the plurality of processing elements excluding the designated processing elements;
    determining whether an interrupt request has occurred while the processing elements excluding the designated processing elements are executing the loop operation; and
    controlling the one or more designated processing elements to process the interrupt request when the interrupt request has occurred, a portion of the central register file being reserved for handling the interrupt request.

11. The interrupt handling method of claim 10, wherein the designating of the one or more of the processing elements comprises mapping instructions related to the loop operation to the processing elements excluding the designated processing elements.

12. The interrupt handling method of claim 10, wherein the interrupt request is processed in parallel with the loop operation.

* * * * *